Jan. 9, 1934.  A. G. LANGENKAMP ET AL  1,943,023
BREAD RACK
Filed March 4, 1932  2 Sheets-Sheet 1
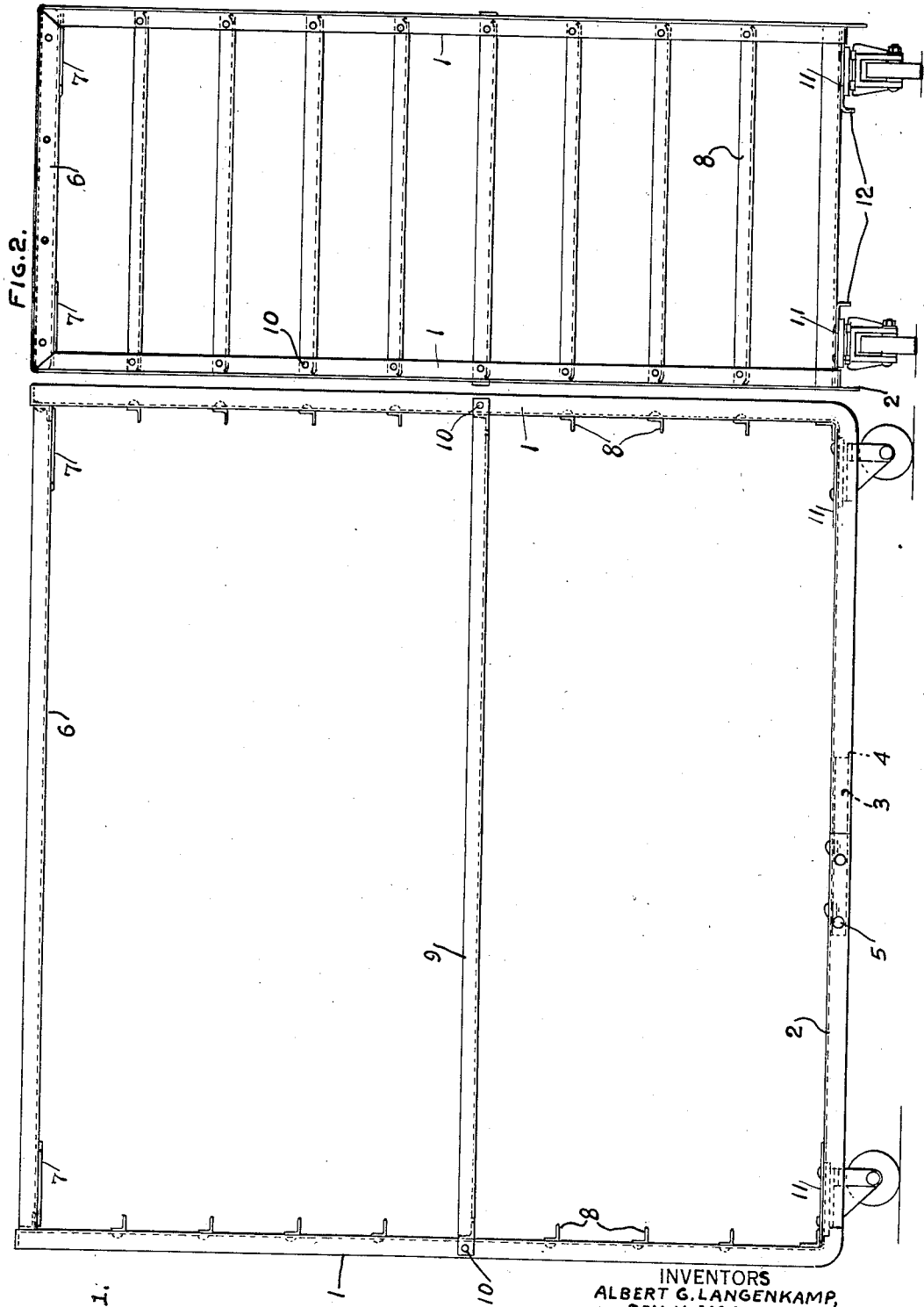
INVENTORS
ALBERT G. LANGENKAMP,
ROY H. McELROY,
BY
Toulmin & Toulmin
ATTORNEYS

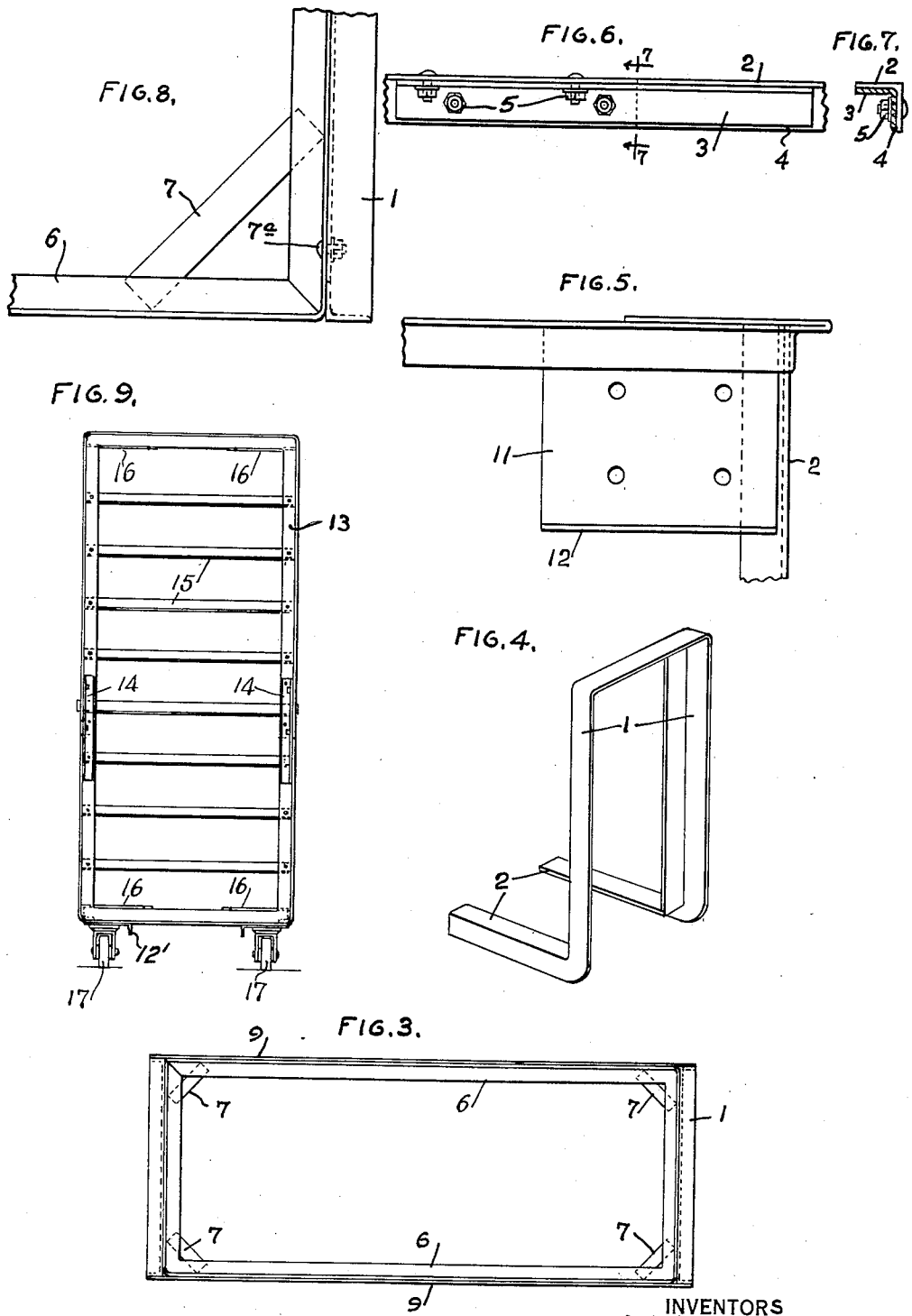

UNITED STATES PATENT OFFICE 1,943,023

BREAD RACK

Albert G. Langenkamp and Roy H. McElroy, Dayton, Ohio, assignors to International Engineering, Inc., Dayton, Ohio, a corporation of Ohio Application March 4, 1932. Serial No. 596,824

4 Claims. (Cl. 280—49)

This invention relates to improvements in bread racks, and particularly bread racks supported on wheels or casters and adapted to be rolled from one part of a building to another part of the building.

Frames of this kind are generally subject to rough usage and heat, and unless sturdily built become bent and warped. The present invention has for its object to provide such a strong and durable bread rack.

The frame part of the rack is composed of a pair of angle irons, bent and attached to each other to form the bottom and end uprights. These uprights are attached by intermediate longitudinal bars to a top frame, whereby a strong and substantial bread rack is produced.

These and other advantages will appear from the following description taken in connection with the drawings.

It will be understood that the rack, while shown in view as being supported on wheels, may be inverted and suspended from the track without modifying the principles of operation and construction.

Referring to the drawings:

Figure 1 is a side elevation of the bread rack.

Figure 2 is an end elevation thereof.

Figure 3 is a top plan view thereof.

Figure 4 is a perspective view of one of the U-shaped members forming a part of the complete rack frame.

Figure 5 is a bottom plan view of one corner of the rack.

Figure 6 is a fragmentary view showing the manner in which the two U-shaped members are attached.

Figure 7 is a section on the line 7—7 of Figure 6.

Figure 8 is a top plan view of one corner of the rack.

Figure 9 is an end elevation of a slightly modified form of rack.

In the forms shown in Figures 1, 2 and 3 the end of each rack is formed from a U-shaped member 1, such as shown in Figure 4. This U-shaped member has extending laterally from the open ends of the arms thereof, arms 2. Each of these arms 2 of one U-shaped member is attached to a similar arm of another U-shaped member by means of angle irons 3. The manner in which the arms 2 are attached to each other is shown in Figure 6.

The angle irons are each attached at one end to one of the arms 2 by means of welding 4. The other end of each of these angle irons is attached to one arm of a second U-shaped member by means of rivets or bolts 5. When the two U-shaped members are attached by means of two angle irons a frame is presented, such as shown in Figure 1, without the presence of the rack brace frame 6 attached to the top of the U-shaped members in any suitable manner, and without the longitudinal brace bars 9.

The frame 6 is attached to the upper ends of the U-shaped members by means of rivets or bolts 7a. This frame is strengthened by means of diagonal brace or corner plates 7, welded at each end to the bottom flange of the angle irons forming the sides and the ends of the frame brace.

For the purpose of holding trays of bread there is provided on each U-shaped member a support 8, attached to the U-shaped member by means of rivets similar to rivets or bolts 7a. These supports are arranged in pairs, one on each U-shaped member, in horizontal alignment with each other so there is provided, as shown in Figure 1, eight supports for trays, one on each U-shaped member. The trays are supported at each end on the supports 8.

The longitudinal brace member 9 extends longitudinally of the rack approximately midway between the bottom of the frame formed by the arms 2 and the top of the frame formed by the rectangular brace frame 6, and is attached to the U-shaped member by means of rivets or bolts 10. As thus formed the rack is composed of two frame pieces united by two angle irons, and in order to strengthen the frame formed of these two parts the longitudinal braces 9 are provided, intermediate the ends of the U-shaped members, and there is also provided at the top the frame 6.

In order to provide supports for the rollers or casters at each corner of the frame, there is a gusset 11. Each gusset is welded to a horizontal part of the arm 2, and also to the under side of the lower tray support, as clearly shown in Figures 1 and 5. Each gusset has a turned-down edge 12 for adding strength and rigidity to the gusset.

In the form shown in Figure 9, instead of each end of the rack being formed from a single U-shaped member, each end is formed of a pair of U-shaped members 13, united by means of angle plates 14. These angle plates are either welded or attached to the U-shaped members by means of bolts or rivets in the manner set out in connection with the structure shown in Figure 1.

In this form the U-shaped members do not have the arms 2. The two U-shaped members are united to one another, independent of any arms, and in order to form the top and the bottom parts of the bread frame, frames similar to frame 6 are provided, one for the bottom of the rack and the other for the top of the rack, and are attached to the end members by means of rivets or bolts, or by means of welding. This form of rack has tray supports 15, braces 16 similar to the braces 7, and a gusset similar to gusset 11, having a downturned strengthening edge 12. Each form of rack has a caster 17 attached to the gusset in any suitable manner.

We desire to comprehend within our invention such modifications as may be embraced within our claims and the scope of our invention.

Having thus fully described our invention, what we claim as new and desire to secure by Letters Patent, is:

1. In a bread rack, a frame therefor having each end formed of a U-shaped strip of metal, each strip having integral laterally extending parallel arms, and connecting bars welded to the arms of one U-shaped strip and detachably secured to the arms of the other strip.

2. In a bread rack, a frame consisting of a pair of one-piece upright end members formed of U-shaped angle irons having their free ends bent to form arms and united to form the lower sides of the frame, an angle iron rectangular frame attached at its ends to the upper ends of the end members, and a gusset member welded to each arm adjacent its end member.

3. In a bread rack, a frame consisting of upright end members formed of U-shaped angle irons having their free ends bent to form arms and united to form the lower sides of the frame, an angle iron rectangular frame attached at its ends to the upper ends of the end members, a gusset member welded to each arm adjacent its end member, and an angle iron tray support welded to the end members at each end of the frame.

4. In a bread rack, a frame consisting of upright end members formed of U-shaped angle irons having their free ends bent to form arms and united to form the lower sides of the frame, an angle iron rectangular frame attached at its ends to the upper ends of the end members, a gusset member welded to each arm adjacent its end member, an angle iron tray support welded to the end members at each end of the frame, and a roller support means on each gusset member.

ALBERT G. LANGENKAMP.
ROY H. McELROY.